United States Patent
Christofilos

[15] 3,668,067
[45] June 6, 1972

[54] POLYGONAL ASTRON REACTOR FOR PRODUCING CONTROLLED FUSION REACTIONS

[72] Inventor: Nicholas C. Christofilos, Hayward, Calif.
[73] Assignee: The United States of America as represented by the United States Atomic Energy Commission
[22] Filed: Oct. 16, 1969
[21] Appl. No.: 867,035

[52] U.S. Cl. .................................................176/5, 315/111
[51] Int. Cl. ...........................................................G21b 1/02
[58] Field of Search .................................................116/1–10

[56] References Cited

UNITED STATES PATENTS

| | | | |
|---|---|---|---|
| 3,036,963 | 5/1962 | Christofilos | 176/4 |
| 3,071,525 | 1/1963 | Christofilos | 176/4 |
| 3,085,173 | 4/1963 | Gibson et al. | 176/5 |
| 3,170,841 | 2/1965 | Post | 176/7 |
| 3,219,534 | 11/1965 | Furth | 176/7 |
| 3,230,145 | 1/1966 | Furth et al. | 176/5 |
| 3,485,716 | 12/1969 | Bodner | 176/4 |

*Primary Examiner*—Reuben Epstein
*Attorney*—Roland A. Anderson

[57] ABSTRACT

An Astron reactor including a plurality of linear magnetic field regions joined by intervening curved magnetic fields and arranged in a polygonal configuration. Energetic charged particles are introduced and trapped in the linear sections to form cylindrical sheaths, i.e., E-layers, of charged particles rotating about the axis of each section with the magnetic field thereof interacting with the linear magnetic regions to produce a closed system of magnetic field lines defining a containment zone for charged particles. Fuel materials introduced into the field are ionized and heated to form a high temperature plasma trapped in said zone. The ratio of the lengths of the linear and curved field regions is regulated to offset Bohm diffusion losses. A high molecular weight initiator plasma may also be introduced to heat the fuel to fusion temperatures.

10 Claims, 3 Drawing Figures

INVENTOR.
Nicholas C. Christofilos

INVENTOR.
Nicholas C. Christofilos
BY
ATTORNEY.

POLYGONAL ASTRON REACTOR FOR PRODUCING CONTROLLED FUSION REACTIONS

BACKGROUND OF THE INVENTION

This invention was made under, or in, the course of Contract No. W-7405-ENG-48 with the United States Atomic Energy Commission.

Devices employed and proposed heretofore for the production and containment of high temperature gases or plasmas utilize magnetic fields of a diversity of configurations. Two well-known categories of such machines are the socalled open-ended types such as the magnetic mirror or Pyrotron devices and toroidal devices such as the Stellarator, Levitron and the like.

A further class of such devices is represented by the Astron such as that disclosed in my U. S. Pat. No. 3,071,525, issued Jan. 1, 1963, entitled "Method and Apparatus for Producing Thermonuclear Reactions." In the aforesaid "Astron," an elongated linear axially symmetric magnetic field is established in an evacuated vessel. Such field includes terminal regions of increased magnetic field intensity constituting magnetic mirror closure fields. Relativistic electrons are injected and trapped, e.g., by a method involving localized manipulations of magnetic fields or to form a cylindrical sheath or E-layer of relativistic electrons rotating about the axis between the mirror portions of said magnetic field. Thereafter thermonuclear fuel material is introduced into the magnetic field to be ionized and heated by collisional interaction with the electrons of the E-layer. The heated ions formed in this manner are trapped and contained in the closed system of magnetic field lines or containment zone provided by interaction of the external field with that of the E-layer. An Astron employing a different arrangement for injecting the relativistic electrons is disclosed in my U. S. Pat. No. 3,036,963 issued May 29, 1962. Furthermore, in my copending application Ser. No. 868,268, entitled "Proton E-layer Astron For Producing Controlled Fusion Reaction," and filed on Oct. 16, 1969, there is disclosed a linear Astron which utilizes a proton E-layer rotating in a magnetic field somewhat in the manner of the electron E-layer disclosed in my above-identified patents, to define a zone for the production and containment of a high-temperature gas or plasma. The proton E-layer Astron is characterized by more effective heating of a fuel introduced to form the plasma and by highly stabilized containment of such a plasma. These features may considerably facilitate attainment of plasma densities at temperatures at which certain light nuclide elements may undergo fusion reactions. The foregoing Astrons are all in the nature of "open-ended" linear devices.

Toroidal magnetic field systems, such as that employed in the Stellarator, being endless systems, avoid the problems stemming from the open ends inherent in linear systems. However, toroidal systems including the twisted figure-eight configuration of the Stellarator aggravate plasma losses due to socalled anomalous Bohm diffusion which is caused by the curvature of the magnetic field which is inherent in toroidal systems. Toroidal magnetic field systems, including the Stellarator, are also subject to instabilities which propagate unimpeded along the length of the toroidal field as well as to other types of instabilities. Moreover, in linear systems, other than the Astron, and especially in toroidal systems it is difficult to obtain adequate heating of the plasma, e.g., to fusion temperatures. A need exists for improvement of toroidal magnetic field containment systems with respect to offsetting plasma losses by various diffusion processes, instabilities, etc., as well as for introducing, accumulating and heating of plasma particularly for use in producing controlled thermonuclear or fusion reactions of light nuclide elements.

SUMMARY OF THE INVENTION

This invention relates, in general, to the production of high temperature gases or plasmas and, more particularly, to methods and devices for producing high temperature plasmas in generally toroidal magnetic fields.

An improved generally toroidal magnetic containment field is now provided in the form of a plurality of elongated linear axially symmetric magnetic field sections arranged with intervening curved magnetic fields in the form of a continuous generally polygonal toroidal magnetic field system. The magnetic fields are provided by appropriate solenoids distributed along an evacuated vessel of corresponding polygonal configuration. The central portions of the linear magnet field regions are of a uniform magnetic field strength while the end portions of the linear regions and/or the curved portions are of at least a slightly intensified magnetic field strength providing magnetic mirror field closures for the linear field regions. Beans of relativistic energetic particles are directed at appropriate locations into the magnetic field from exterior sources and are trapped to form a cylindrical energetic charged particle sheath or layer, i.e., E-layer rotating about the axis of each of said linear field sections. Relativistic electrons may be injected and trapped to form a relativistic electron E-layer or preferably, an appropriate energetic particle beam, e.g., an energetic molecular ion beam may be injected and disassociated to from a positive particle, e.g., proton E-layer. In either case the magnetic field of the E-layer interacting with the external magnetic field produces a system of closed magnetic field or partially closed field lines defining a containment zone of the Astron type extending along the axis of each of said linear field regions between the closure field regions.

A neutral fuel material, e.g., solid, liquid or gaseous material containing at least one light element nuclide such as hydrogen, deuterium, tritium, $He_3$, or other fusionable isotope, is introduced into said containment zones to be heated and ionized by interaction with the E-layer particles. To facilitate heating, a high energy content plasma, e.g., of neon or xenon ions, may first be introduced into one or more of said containment zones from sources disposed exterior to said vessel. Also, lithium vapor may be introduced into the vessel to facilitate trapping of the energetic particles. Lithium breeder blankets provided with means for removing and transferring the heat generated by the fusion plasma and/or in the blankets to external power generating equipment, may also be provided.

The foregoing system has many advantageous features. At the outset, the Astron type containment zones in each linear section facilitates the formation of a high temperature plasma and containment thereof under conditions highly stabilized against occurrence of instabilities which could result in excessive plasma loss by diffusion. Bohm diffusion is essentially absent from the linear sections and is confined principally to the curved field regions so that the loss of plasma by Bohm diffusion can be reduced to any desired level by proportionately increasing the ratio of linear to curved field lengths. Moreover, instabilities are prevented from propagating longitudinally within the polygonal field by means of the mirror field regions while the advantage of elimination of end losses, inherent in toroidal systems is still retained.

Accordingly, it is an object of the invention to provide procedures and devices for producing highly elevated temperatures.

Another object of the invention is to provide procedures and devices for generating and containing a high temperature gas or plasma.

Still another object of the invention is to provide a device for producing a high temperature plasma in an axially symmetric magnetic field containment zone which is stabilized against instabilities by means of relativistic charged particle beam currents rotating in a cylindrical path therein and in which the relativistic particles provides energy for ionizing and heating a fuel material therein.

A further object of the invention is to provide a device for containing a high temperature gas or plasma utilizing a plurality of linear axially symmetric magnetic field sections, each stabilized against instabilities by means of a cylindrical sheath of relativistic charged particles rotating about the axis and together with curved toroidal magnetic field sections interconnecting the ends of said linear sections.

A still further object of the invention is to provide a controlled fusion device wherein means are provided for producing a plurality of linear uniform intensity axially symmetric magnetic fields bounded between intensified magnetic field regions and joined by intensified curved magnetic field regions in a generally polygonal toroidal evacuated vessel together with means for producing cylindrical E-layers of relativistic charged particles rotating about the axis of said linear field regions to provide a plural sequence of interconnected plasma containment zones therein.

A further object of the invention is to provide a device for producing and containing a high temperature plasma in magnetic containment zone in which a high energy initiator plasma is accumulated and into which a cold fuel is introduced to be heated and ionized by interaction with the initiator plasma.

Other objects and advantageous features of the invention will be set forth in the following description and the accompanying drawing, of which:

Figure 1:
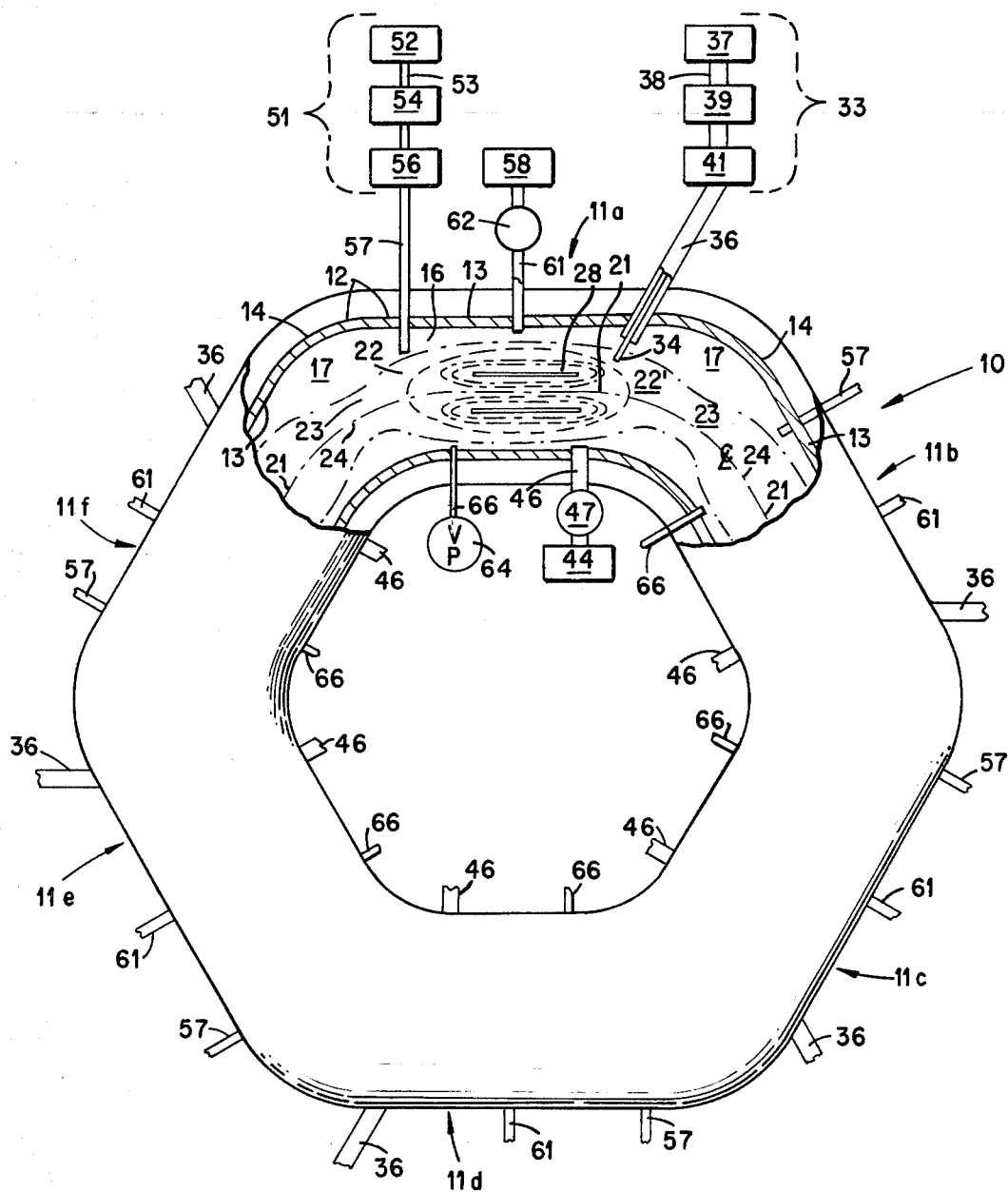
FIG. 1 is a plan view partially in section of a polygonal toroidal controlled fusion reactor in accordance with my invention.

Thermonuclear reactions generally considered most feasible for use in controlled fusion reactors are the DD and DT reactions while the DHe$^3$ and other reactions involving light nuclides are also possible. The foregoing reactions proceed at an appreciable rate at densities of the order of $10^{14}$ to at least $10^{16}$ particles/cc and at temperatures of the order of $10^4$ to about $10^6$ keV ($10^{80}$ to $10^{9\,\circ}$ Kelvin). For consideration as to producing significant power output, confinement times of at least a few tenths of a second with densities of the order of $10^{15}$ ions/cc, are required. The foregoing conditions are interrelated so that improvement of any one factor makes possible operation at a lower value of another factor. Moreover, in other applications requiring production of heated plasma, e.g., in laboratory devices used in plasma research, intense light production, etc., operation is possible at much lower levels of temperature, plasma density and the like. Of course, under such conditions power output, neutron production, etc., are correlatively reduced.

Major effects have been directed toward attaining stable confinement of heated plasmas which is necessary to obtain the requisite confinement times. Heretofore, only partial success has been attained in toroidal confinement systems. Confinement has tended to be limited by the onset of anomalous plasma diffusion to a rate which is of the order of the socalled Bohm diffusion rate, i.e., which is of the order of $10^6$ times as fast as the much more favorable classical diffusion rate which has generally been considered theoretically applicable. Accordingly, with respect to the confinement of high temperature plasmas, including those produced and utilized in controlled thermonuclear reactors, it is now generally agreed that the effective period of confinement in practical systems may ultimately be determined by the socalled Bohm confinement time rather than by anomalous diffusion or classical diffusion processes. (For definitions as to the foregoing diffusion processes see "Controlled Thermonuclear Reactions," Chapter 12, Glasstone and Lovberg, Editors, published by D. Van Nostrand Co., Inc.)

The loss of plasma hinders attainment of sustained reaction conditions by unduly delaying or preventing buildup of a plasma to adequate densities and also in the loss of energetic charged reaction products, e.g., He$_4^+$ which carry off the reaction energy which would otherwise be available for heating or maintaining the temperature of the plasma. A high rate of plasma diffusion can be tolerated, however, if the fusion rate is high enough so that the energy released to the plasma by the charged fusion reaction products, that is the trapped 3.5 MeV α-particles, can sustain the plasma at fusion temperature. Plasma parameters have now been found under which a controlled fusion reaction plasma can be sustained by the energy of the fusion reaction products even where the diffusion loss rate approaches the pessimistic value of 15 to 30 times as great as the Bohm diffusion rate.

A toroidal reactor or confinement system which can, even under the most pessimistic assumptions, satisfy this condition, is now provided in the form of a plurality of long linear magnetic field sections. Then the plasma lifetime $$T_f = T_B (L/2nR_m),\qquad\qquad \text{I.}$$

where $T_B$ is the Bohm confinement time, $L$ is the total length of the straight sections and $R_m$ is the major radius of the toroidal sections. The advantage over an "average minimum-B" geometry heretofore contemplated is that the ratio of the low loss to high loss sections can be made arbitrarily large.

While relativistic electrons can be used to form an E-layer which stabilizes the magnetic field against various instabilities, certain advantages may be obtained using a positive particle E-layer, e.g., a proton E-layer as disclosed in my aforesaid copending application. More particularly, stability in the straight sections is achieved by confining the plasma in the minimum-B field provided by a sequence of weak proton E-layers with an average diamagnetic strength of at least about 25 percent, thus providing a magnetic well with ($\Delta B/B$ external) = 0.25 which can generally be accepted as a sufficient condition for stability. The energy of the E-layer protons or other relativistic charged particle for this purpose are provided with an energy of at least one to two BeV. The power density of the fusion reactions required to sustain a plasma, with an average diffusion rate of 15 to 30 times slower than Bohm rate, is so high, however, that only pulsed operation is possible with a duty factor of the order of $10^{-3}$. The corresponding plasma lifetime is 15 to 100 msec which creates a major problem. To utilize such a short plasma confinement period effectively the heating of the plasma to fusion temperature must be done in less than about 10 msec.

In order to heat the plasma to fusion temperature in a very short time it is now proposed to use an "ignitor plasma" of quasi-relativistic charged particles of anisotropic velocity distribution trapped in the straight sections. In the magnetic mirror machine experiments it has heretofore been found that such plasmas are stable as long as the ion plasma frequency is smaller than the ion gyrofrequency. The quasi-relativistic ions (a few hundred MeV per nucleon) are injected in the form of molecular ions are trapped by disassociation. The "ignitor" plasma is accumulated slowly in several 10 of seconds until the trapped energy density is slightly higher than the energy density of the desired thermonuclear plasma. Then an appropriate fuel, e.g., DT (deuterium-tritium) pellets are introduced abruptly, which fuel is promptly ionized to form a plasma. The energy of the quasi-relativistic plasma is then transferred to the DT plasma by Coulomb interactions in less than 10 msec, producing a thermonuclear plasma of 10 keV or higher temperature depending on the energy content of the ignitor plasma and of the charged particle E-layer.

The disclosed method of heating is so powerful that it makes possible by proper choice of the atomic number of the ions of the ignitor plasma, to heat a DT mixture of 10 keV in one millisecond, e.g., equivalent to one Bohm confinement time, ($B = 250\ kG$, $R = 50$ cm) which is a highly pessimistic estimate of what can be achieved in practice. Such a plasma cannot be continuously sustained, however, because the fusion rate even at a field of 250 $kG$ with equivalent densities is not high enough to sustain the plasma. Because the method of heating is so powerful, however, one can contemplate operation under unfavorable conditions where the ratio of the straight sections to the toroidal sections is not long enough to allow the plasma to be sustained by fusion reactions but this ratio can be adequate to allow the ignitor plasma to create a transitory thermonuclear plasma at thermonuclear temperature and density.

Method of Calculating Plasma Parameters in A Polygonal Toroidal Astron

The Bohm lifetime for a plasma having a parabolic density distribution, $n$, is $$n = n_o \left[ 1 - \left(\frac{r}{R}\right)^2 \right] \qquad \text{II.}$$

$$T_B = 1.8 \left(\frac{B_o}{10^5}\right) \left(\frac{R}{100}\right)^2 \left(\frac{10}{U}\right) \quad \text{msec.} \qquad \text{III.}$$

where $R$ is the plasma radius, $B_o$ is the external magnetic field in Gauss at $r = R$, $u$ is the plasma temperature in keV, and $R$ is the plasma radius in cm.

Since the Bohm lifetime is independent of the plasma density it is always possible to find a plasma density at which the rate of reaction is high enough to sustain the plasma. Let $L$, $R_m$ be the total length of the straight sections and the major radius of the toroidal sections respectively. Then the energy loss if the toroidal section is $$W_B = \frac{W_j}{\alpha T_B} 2\pi R_m, \qquad \text{IV.}$$

where $W_j$ is the energy stored per cm length of the plasma and "$\alpha$" is the ratio of the plasma lifetime to Bohm lifetime. Substituting numerical values we find $$W_B = 0.22 \frac{\beta}{\alpha} \left(\frac{U}{10}\right) \left(\frac{B_o}{10^5}\right) \left(\frac{R_m}{100}\right) 10^6 \text{ MW (Megawatts)} \qquad \text{V.}$$

The energy released from the 3.5-MeV $\alpha$-particles to the plasma along the straight sections $W_f$ is $$W_f = L \left(\frac{\pi R^2}{3}\right) n^2 \left(\frac{\overline{\sigma v}}{4}\right) 5.25 \cdot 10^{-19} \text{ MW.} \qquad \text{VI}$$

Substituting numerical values we find $$W_f = 2 \left(\frac{L}{100}\right) \left(\frac{R}{100}\right)^2 \left(\frac{10}{U}\right)^2 \langle (\overline{\sigma v} \, 10^{16}) - 0.04 U^{1/2} \rangle$$

$$\beta^2 \left(\frac{B_o}{10^5}\right)^4 10^3 \text{ MW.} \qquad \text{VII.}$$

pressure and the term $0.04 \, U^{1/2}$ accounts for the bremsstrahlung radiation loss.

The plasma is sustained when $W_f = W_B$. Equations V and VII yield $$LR \left(\frac{B}{10^5}\right) \frac{\alpha \beta}{\lambda} = \frac{100 \, (U/10)^3}{\langle 10^{16} \, \overline{\sigma v} - 0.04 U^{1/2} \rangle}, \qquad \text{VIII.}$$

where $\sigma$ is the reaction cross section, $v$ is the energy of the ions and $\lambda$ is the aspect ratio of the toroidal sections, and $L$, $R$ are expressed in meters.

The term on the right side is minimized for $U = 8 \, keV$. The minimum varies slowly, i.e., is rather broad, however, and we can therefore chose $U = 10 \, keV$ for simplicity. Then $$LR \left(\frac{B}{10^5}\right)^3 = \frac{110 \lambda}{\alpha \beta}. \qquad \text{IX.}$$

We chose $\lambda = 6$, $\beta = 0.33$, $\alpha = 1$. Table I gives plasma parameters for various values of the magnetic field.

TABLE I.

| B (kG) | R (m) | L (m) | $T_B$ (msec.) | $T_f$ (msec.) |
|---|---|---|---|---|
| 100 | 1.0 | 2000 | 1.8 | 94.0 |
| 125 | 1.0 | 1000 | 2.25 | 60.8 |
| 200 | 1.0 | 250 | 3.6 | 23.1 |
| 250 | 0.5 | 250 | 1.12 | 15.2 |

The purpose of this exercise is to illustrate a method rather than optimize parameters. Therefore we shall use for further discussion the last example [L = 250 m, (straight section) total circumference including curved sections, 270 m].

It is known from mirror experiments that anisotropic plasma can be trapped for a relatively long time in a mirror field. Scattering from any cause scales as $(v^3 \gamma^2)$; therefore, confinement of an anisotropic plasma of several hundred MeV/nucleon for several tens of seconds should be feasible as long as $(\omega_{pi}^2/\omega_{ci}^2)$, i.e., the ratio of the plasma frequency to the cyclatron frequency is less than unity. The anisotropic plasma is injected in the form of molecular ions and trapped by dissociation. The kinetic energy of this plasma should be somewhat higher than the kinetic energy of the desired thermonuclear plasma. Thus we have $$\frac{\omega_{pi}^2}{\omega_{ci}^2} = \frac{4\pi N \gamma M c^2}{B_o^2} < 1 \qquad \text{X.}$$

where N is density in ions/cc., M is the mass of the ions and $\lambda$ is the energy of the ions in relativistic mass units.

$$N(\gamma - 1) M c^2 > \beta \frac{B_o^2}{8\pi}. \qquad \text{XI.}$$

Inequalities X and XI yield $$\gamma > \frac{2}{2 - \beta}, \qquad \text{XII.}$$

where $\beta$ is the ratio of the desired thermonuclear plasma pressure to the magnetic field pressure.

For $\beta = 0.33$, $\gamma = 1.2$; i.e., the relativistic mass corresponding to an energy of the ions of the quasi-relativistic plasma should be higher than 185 MeV per nucleon.

We shall calculate now the rate of energy transfer from the quasi-relativistic plasma to the thermonuclear plasma. The lifetime, $T_f$, of the thermonuclear plasma ions at steady state is $$T_J = \frac{W_j}{W_f}, \qquad \text{XIII.}$$

where $W_j$ is the energy stored in the plasma, $$W_j = \beta \frac{B^2}{8\pi} \left(\frac{\pi R^2}{2}\right). \qquad \text{XIV.}$$

and $W_f$ is given by Eq. VII divided by the length L of the straight section. Equations VII, XIII, and XIV yield $$T_f = 38.4 \left(\frac{10^{16}}{n}\right) \left[\frac{l \cdot 10}{10^{16} \, \overline{\sigma v} - 0.04 \, U^{1/2}}\right] \text{ msec.} \qquad \text{XV.}$$

The energy loss of the energetic particles of atomic number Z in the DT mixture is $$E = \frac{2Z^2}{\beta} \left(\frac{n}{10^{16}}\right) \text{ MeV/msec.} \qquad \text{XVI.}$$

where $\beta = v/c$. Integration of Eq. XI yields the time, $T_c$, for the total energy loss $$T_c = \frac{E_o \beta_o A}{3 Z^2} \left(\frac{10^{16}}{n}\right) \text{ msec.} \qquad \text{XVII.}$$

where $E_o$ is the kinetic energy of the energetic ions in MeV/nucleon, A is the atomic weight, and $\beta_o = v_o/c$ the initial ion velocity. The coulomb transfer time $T_c$ should be no longer than $T_f$. Hence for $U = 10 \, keV$, Eqs. XIII and XVII yield $$\frac{Z^2}{A} = 8.7 \cdot 10^{-3} E_o \beta_o, \qquad \text{XVIII.}$$

for $E_o = 200$ MeV, $\beta_o = 0.57$, and $(Z^2/A) = 1$.

Thus it is shown that protons under the indicated conditions are adequate to heat the plasma to 10 keV within the desired plasma lifetime. Nuclear interactions, however, would scatter to the wall a large fraction of the protons. Thus an ion of higher atomic number is preferable for the ignitor plasma. Non for example, $(Z^2/A) \approx 5$, will ignite the plasma in a time which is five times shorter than the plasma confinement time.

The neon plasma is confined within the minimum-B of the E-layer. A sufficient condition for stability is a well depth of 25 percent which in turn requires an E-layer with the familiar $\sin^2(kz)$ axial current distribution with $\zeta = 0.25$. It is assumed that during the buildup of the ignitor plasma a background plasma of $10^{12}$ ions/cm$^3$ may be required for E-layer stability, which causes some losses (10 to 20 percent) of the ignitor plasma during its buildup phase.

The Bohm lifetime, $T_b$, of a plasma confined in a radius of 50 cm in a field of 250 kG is $$T_B = 1.12 \text{ msec.} \qquad \text{XIX.}$$

For a length $L = 250$ m $$T_f = 15.2 \text{ msec.} \qquad \text{XX.}$$

If neon ions are used for the ignitor plasma the Coulomb transfer time is $$T_c = 4.5 \text{ msec.,} \qquad \text{XXI.}$$

i.e., the thermonuclear plasma is heated at the rate of 2 $keV$/msec. This rate would be further enhanced to 10 $keV$/msec. if xenon ions are used for the ignitor plasma. This rate of energy deposition approximates that of the most energetic chemical explosives, e.g., TNT! The other parameters of the neon plasma are:

Energy per ion $\quad E_t = 5$ BeV
Energy per nucleon $\quad E_o = 250$ MeV
Ion Density $\quad N_i = 10^{11}$ ions/cm$^3$
$\omega_{pi}^2/\omega_{pi}^2 = 0.8$ During the heating up of the thermonuclear plasma the total energy of the ignitor and the thermonuclear plasma remains constant; thus the increased pressure of the thermonuclear plasma is compensated by the reduced pressure of the ignitor plasma.

It has been indicated that an E-layer of 2 BeV protons providing a partial field reversal, i.e., $\zeta$ of 0.25, , i.e., ratio of E-layer magnetic field to external magnetic field strengths and representing the diamagnetic field strength produced by the E-layer current is somewhat marginal for providing adequate heating. However, it may be noted that the E-layer current density can be raised as high as necessary to provide an energy density sufficient for plasma fusion ignition. With 1 BeV protons and an E-layer current providing a value $\zeta = 1.6$ heating of a TD plasma would be adequate to produce a significant fusion reaction rate.

A polygonal-toroidal high-temperature plasma device or reactor 10 in accordance with the invention is shown, generally in FIG. 1 of the drawing. Such reactor is constructed with six identical sections 11a, b, c, d, e, and f respectively. For simplicity, certain details of the construction of only one such section, i.e., section 11a are shown in FIG. 1, with more complete details thereof being shown in FIG. 2. However, it is to be understood that each of the other sections, i.e., 11b–11f, are substantially identical in construction to section 11a and are outfitted in a substantially identical fashion.

More particularly, reactor 10 is provided with six such substantially identical sections but may be constructed with as few as five sections to as many as about 10 or more sections as is convenient to construct but preserving the ratio of straight to curved section lengths as noted elsewhere herein. The six sections 11a through 11f of reactor 10, are arranged in a generally regular hexagonal configuration and include a cylindrical toroidal magnetic field permeable vacuum vessel 12 comprising a linear vessel section 13, in each of said reactor sections, joined by curved vessel portions 14, defining a continuous vacuum chamber of generally hexagonal toroidal configuration. The vacuum chamber includes a linear portion 16 defined by each of vessel sections 13 and curved chamber portions 17 defined by curved vessel portions 14.

For purposes of the present invention means are provided to produce a continuous polygonal-toroidal axially symmetric magnetic field within the chamber defined by vessel 12. More specifically, a magnetic field having an elongated region of substantially uniform magnetic field intensity 19 is provided centrally along the axis 21, of the chamber region 16 in each vessel section 11a through 11f and magnetic mirror field regions 22, 22', of increased intensity are produced proximate the ends of each of said vessel sections 11a through 11f. The foregoing magnetic field configuration in each of said vessel sections defines a magnetic mirror field containment zone which is generally effective for confining charged particles and is employed herein to facilitate establishment of the E-layers and for other purposes described elsewhere herein. Furthermore, curved magnetic field regions 23 which are axially symmetric about the center line 24 are established in the chambers 17 of vessel sections 14. The field regions 23 have a field intensity approximating or somewhat exceeding that of magnetic mirror field regions 22, 22' and join the magnetic fields of linear vessel portions, 11a–11f, to form said toroidal field. To distinguish from toroidal magnetic containment fields, known and used heretofore, and which were comprised of curved toroidal vessel sections and correspondingly shaped toroidal fields, the present system which utilizes a succession of linear, i.e., straight sections joined by curved portions, into a generally polygonal configuration, may be termed a polygonal, or hexagonal, etc., toroidal containment fields.

Figure 2:
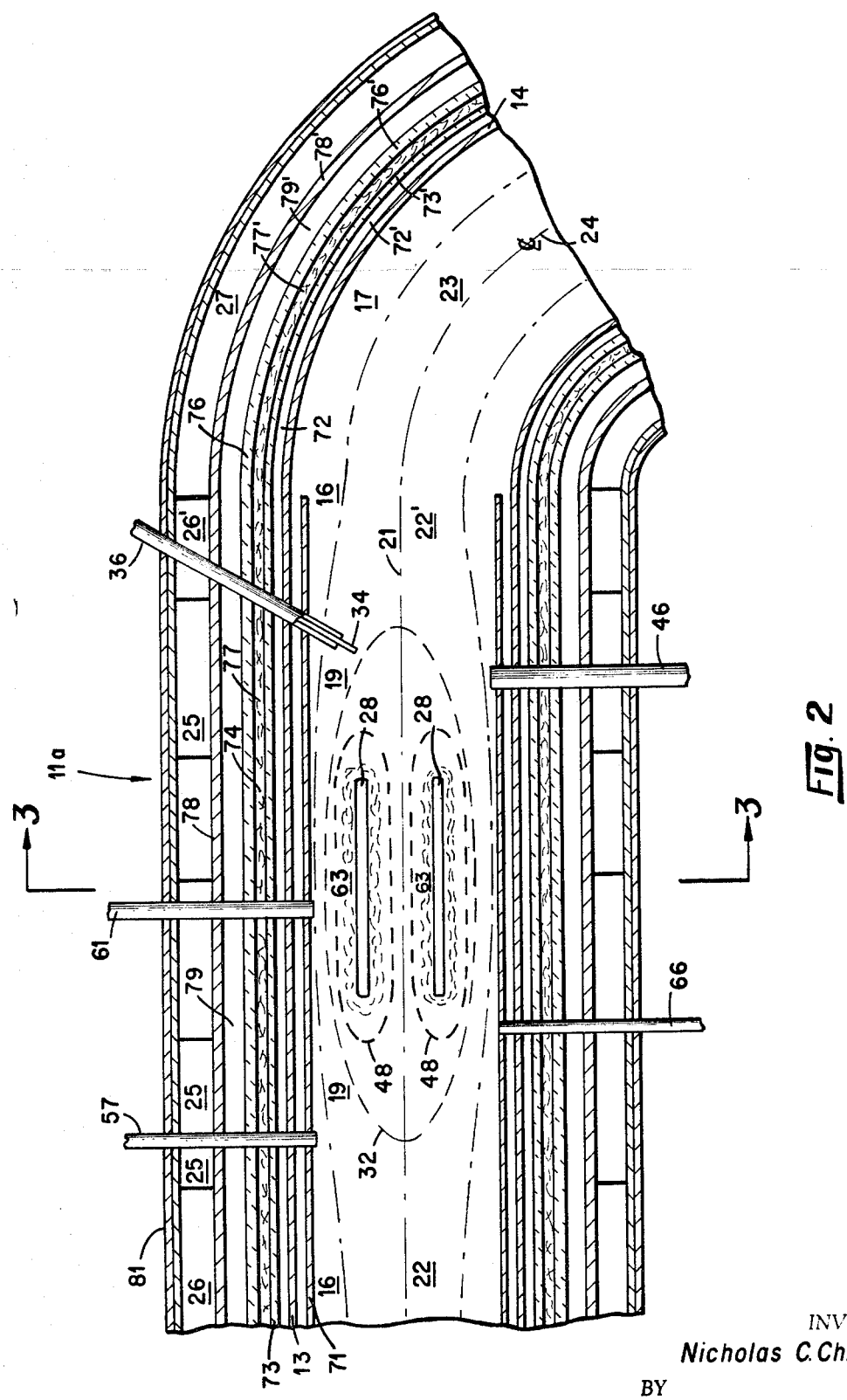
FIG. 2 is an enlarged transverse sectional view of one of the linear sections with an adjacent curved section of the reactor of FIG. 1.

The foregoing polygonal-toroidal magnetic field configuration may be provided, as shown in FIG. 2, by means of solenoidal magnetic coils 25, having a uniform ampere turns distribution and disposed coaxially about vessel sections 11a through 11f, to produce a corresponding linear magnetic field region 19 in each of said vessel sections. Solenoidal coil segments 26, 26' having an increased ampere turn per unit length distribution are disposed coaxially proximate the ends of vessel sections 11a–11f, and encompass and produce magnetic mirror field regions 22, 22', respectively. In a similar fashion magnetic field coils 27 having an ampere turns per unit length distribution approximating or somewhat exceeding that of coil segments 26, 26', coaxially encompass curved vessel sections 14, to establish the respective curved magnetic field regions 23. In usual practice the aforesaid intensified magnetic field regions may have an intensity of from about 1.1 to at least about two times that of the uniform intensity regions.

The foregoing solenoidal coils and coil segments may be connected serially and energized from a D.C. power supply (not shown) or they may be energized by means of individual supplies (not shown) in accordance with conventional practice. It is generally preferred to employ a superconducting coil structure to minimize energy losses; however, cryogenically cooled or other cooled coil structures can be used if losses can be tolerated.

For operation in accordance with the present invention, a cylindrical sheath or E-layer 28 of charged particles having relativistic energies must be established to rotate about the axis 21 of each of the linear reactor vessel sections 11a through 11f. The magnetic field of such an E-layer 28 produced by rotation of the charged particles about said axis 21 interacts principally with the linear region 19 of the external field to produce a pattern of magnetic field lines 32 which define a toroidal magnetic potential well suitable for the confinement of charged particles in the vicinity of said E-layer. This may be accomplished generally by directing a beam of high energy, e.g., relativistic particles which are disruptable, i.e., dissociable in the magnetic field to produce charged particles which as a consequence are trapped to form such an E-layer. Relativistic electrons may be introduced using the procedures and apparatus disclosed in my aforesaid patents. However, since an E-layer including a relativistic charged particle having a mass greater than an electron provides advantages over an E-layer of relativistic electrons, it is preferred to employ such a heavier relativistic charged particle. Light nuclide ions such as $H^+$, $D^+$, $T^+$, $He_3^+$, $He_4^+$, etc., produced by dissociation of a suitable particle of relativistic energies may be used. While in theory a beam of energetic neutral particles, e.g., $H_2$, $D_2$, $T_2$, TD, $He_3$, $He_4$, etc., can be employed, it is generally preferred to use a beam of molecular ions, e.g., $H_2^+$, $D_2^+$, $DT^+$ or the like to provide the relativistic charged particle.

Figure 3:
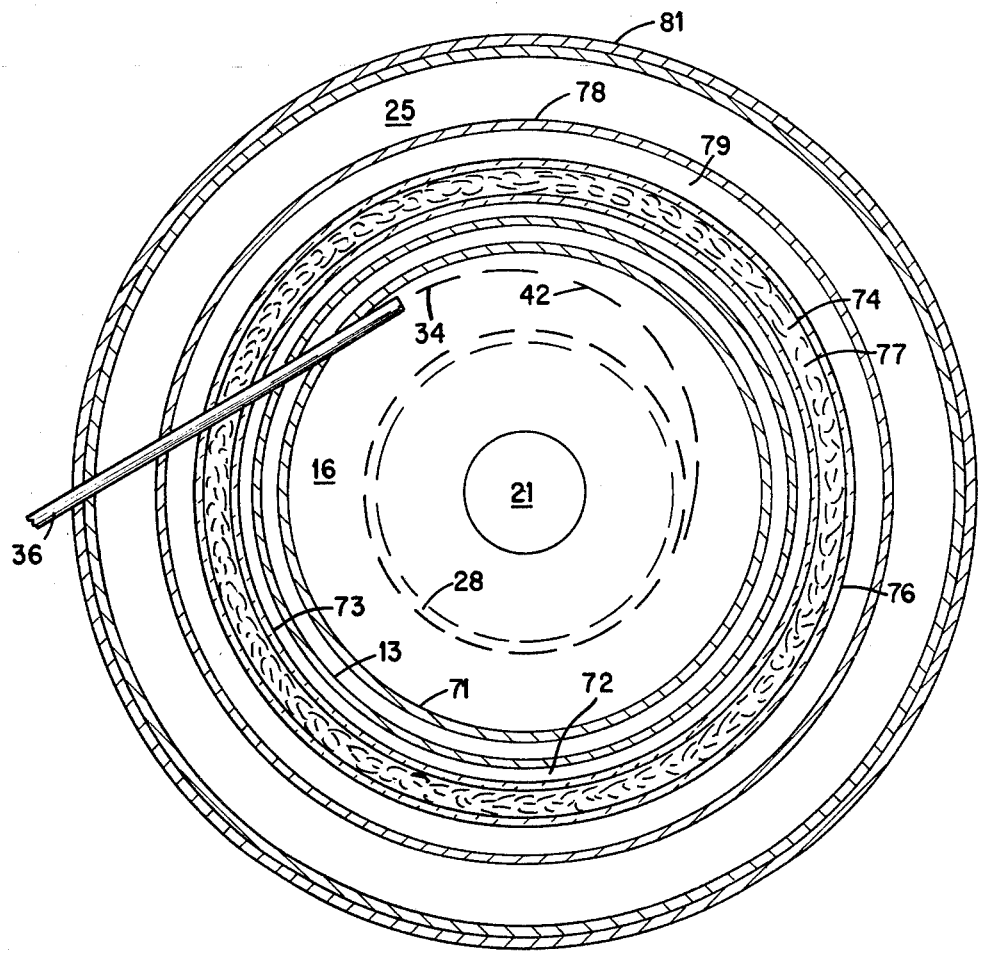
FIG. 3 is a transverse sectional view generally along the plane 3—3 of FIG. 2.

Molecular ions for forming such an E-layer 28 rotating about the axis 21 of reactor 10, may be produced as disclosed in my aforesaid copending application. More particularly, at least one molecular ion beam source 33 may be employed to direct an energetic molecular ion beam 34 through a magnetic shield guide tube 36 into the general vicinity of the juncture of linear magnetic field region 19 with a magnetic mirror field, 22 or 22', in each reactor vessel section, 11a–11f. In FIG. 2, injection in the vicinity of the juncture of field 19 and mirror field 22', is indicated. The beam 34 is directed along a path tangent to a circle of at least about twice the radius of an E-layer 28 and at a slight angle, e.g., 10°, to a plane perpendicular to the axis 21 of said linear vessel section as shown in FIG. 3. Molecular ion beam generators are well known in the art. However, a typical generator may comprise an ion source 37 supplying a beam of molecular ions, e.g., $H_2^+$, $D_2^+$, $TD^+$, $T_2^+$, $He_3^+$, $He_4^+$ or the like which can be disrupted or further ionized as disclosed hereinafter to yield ions of a higher charge to mass ratio suitable for trapping in the magnetic field. The molecular ions from source 37 may be accelerated in an accelerator tube 38 to increase the energy to the desired level, focussed into a narrowly defined beam by a solenoidal lens 39, and the beam purified, e.g., by passage through a quadrupole lens 41 if needed and be eventually directed along the magnetically shielded injector tube 36.

With the foregoing arrangement upon emergence from tube 36, the molecular ion beam 34, e.g., $H_2^+$, initially follows a path tangent to a circle of twice the average diameter of E-layer 28 as determined by the well known cyclotron formula, $$r = \frac{mv}{He},$$

where $r$ = radius of path, $m$ = mass of ion, $e$ is the charge thereon, and $H$ is the magnetic field strength. However, as such ions collide with residual gas molecules and/or plasma particles, the molecular ions are disrupted to provide high energy protons, $H^+$, having a charge to mass ratio of twice that of the molecular ions. Consequently, the beam 34 of high energy protons follows an inwardly curved path, e.g., path 42 in the magnetic field as shown in FIG. 3, to be trapped and to spread along the magnetic mirror zone to form the cylindrical E-layer 28 rotating about axis 21. With magnetic field strengths of above about 150 kilogauss, the molecular ions are effectively disrupted by Lorentz force mechanisms created in a well-known manner by passage of a charged particle through a magnetic field. Such a beam 34 may be introduced as high current pulses, if pulsed operation is desired, or the beam may be introduced in the form of a small continuous current beam over an extended time period. The E-layer 28, with a desired high energy content, may be accumulated or trapped in either case to attain the desired E-layer current and energy density.

The efficiency of trapping of the molecular ion beam 34 can be increased by providing means for interacting a light nuclide gas or vapor therewith. Such a means may include a heated reservoir 44 supplying, e.g., a cloud of lithium vapor through a conduit 46 as regulated by a valve 47, and directed into the path of beam 34. The lithium vapor cloud may be supplied in small puffs to coincide with beam pulses or continuously at least during the initial period of E-layer buildup if a continuous beam current is used. Positive particles in the range of from about 50 MeV to above about 4 BeV may be used dependent on type of plasma and effects desired. For producing fusion reactions molecular ions in the range of about 1 to 4 BeV or above are preferred to supply the required energy for heating the final plasma, e.g., when a proton E-layer along is employed to heat the plasma. However, lower energies can be utilized in the event a supplementary initiator or heater plasma is employed as described below.

In any event, the magnetic field produced by the positive particle current of the E-layer 28, interacts with the magnetic mirror field to produce a system of closed or partially closed magnetic field lines generally bounded by the line 48 defining a generally toroidal minimum B magnetic potential well constituting a toroidal zone in the vicinity of the E-layer for the stable confinement of high temperature gases or plasmas, in accord with usual Astron practice.

The provision of such a system of closed or partially closed magnetic field lines which includes a minimum-B field zone provides confinement of plasma with an isotropic pressure for appropriate configurations and also providing a field line curvature which stabilize against destablizing curvature drifts. At the same time this configuration suppresses hydromagnetic instabilities and high frequency microinstabilities due to loss cone instabilities caused by anisotropic velocity distributions, i.e., non-Maxwellian distributions, since the only anisotropy present is due to the plasma density gradient. Other instabilities which occur in toroidal configurations are also suppressed or eliminated. When a fully formed proton E-layer is employed, protons having an energy range of at least 1 to 5 BeV can themselves provide sufficient energy to heat a T–D plasma fuel to fusion temperatures. However, a proton or other positive particle E-layer, wherein the energy content is not sufficient in itself, to heat the fuel to fusion temperatures can be used to provide a magnetic well with closed lines of force, to provide stable confinement. In such cases the required depth of the magnetic potential well ($\Delta B/B$) is of the order of at least 25 percent for equivalent electron-ion temperatures in the plasma.

The quantity ($\omega_{pE}^2/\omega_{aE}^2$) is a criterion of E-layer stability where $\omega_{pE}$ is the particle plasma frequency and $\omega_{aE}$ is their gyrofrequency. The current density of such a layer to create a magnetic well ($\Delta B/B$) = 0.25 in outwardly diverging portions of the external field is 50 percent of that required for full field reversal. The corresponding value of ($\omega_{pE}^2/\omega_{cE}^2$) for a thick layer is 0.50.

In the event that an initiator plasma is to be injected and accumulated, in such a confinement zone, a second molecular ion beam generator 51, is provided somewhat similarly to source 33, but now producing a heavy nuclide molecular ion beam. More particularly, source 51 may include a molecular ion source 52, accelerator tube 53, focussing lens 54 and purifying lens 56 which directs a collimated molecular ion beam (not shown) through a magnetic shield guide tube 57 at a tangent to a circle larger than the diameter of the E-layer 28, as above. Partially ionized Ne, Xe, or other relatively high Z molecular ion material may be employed. The energy of these molecular ions may range from, e.g., 50 MeV to 4 BeV. The molecular ions are disrupted as above and accumulate in the vicinity of the E-layer 28 to provide the aforesaid heater or initiator plasma.

With a positive particle E-layer as well as with the initiator plasma being present, materials appropriate for forming the desired final high temperature plasma are introduced into said magnetic well containment zone to be ionized, trapped and heated by interaction with the concentrated initiator plasma and/or relativistic charged particles of the E-layer. In the event that an initiator plasma is not employed, the E-layer may be established with a similar high energy density and a plasma formed by introducing a fuel material to interact with the positive ion E-layer particles. In any event there is finally formed a plasma body 63, shown in FIG. II, which is confined in the magnetic potential well in the vicinity of the E-layer.

An appropriate material for forming the plasma, for convenience, termed "fuel material" herein, may be introduced from a source means 58 as through a tube 61 and as controlled by an appropriate valving or metering means 62. A gaseous or fluid fuel (not shown) stored under appropriate pressurized conditions in source 58 may be introduced in a thin stream or as droplets. A solid (not shown) may be similarly dropped in pellet or powder form. The foregoing fuel forms being electrically neutral can penetrate the magnetic field to enter the regions containing the aforesaid initiator plasma and/or the E-layer whereat the energetic particles heat and ionize the fuel which fuel is simultaneously trapped and contained in said confinement zone to form a toroidal plasma body 63 surrounding the E-layer. Other procedures known for introducing relatively cold fuel materials into such a containment zone may likewise be employed.

One or more vacuum pumps 64 are connected to each vessel section, 11a–11f, as by means of a conduit 66 to evacuate the vessel to below about $10^{-6}$ mm Hg as in customary fusion reactor practice.

Fuel materials which are suitable for use in producing thermonuclear or fusion reaction plasmas such as those which yield large quantities of neutrons and heat include tritium-deuterium mixtures (T–D), deuterium, $He^3$ and possibly lithium isotopes. Solid forms of the aforesaid hydrogen isotopes suitable for injection as above include frozen solid or liquified T–D mixtures, fluid or solid tritiated-deuterated hydrocarbons, solid or molten mixtures of lithium-tritide and deuteride, etc. It is also possible to introduce deuterium, tritium, or the like, as an energetic molecular ion as described above to supply at least one of the reactants. It will be appreciated that similar forms of substantially any element may be introduced similarly to produce high temperature plasmas of any desired composition.

As indicated above the foregoing polygonal-toroidal magnetic field configuration provides for confinement of the plasma in the magnetic potential well containment zone under highly stabilized conditions. Moreover, instabilities cannot propagate along the toroidal volume or be reinforced significantly between successive containment zones due to the interposition of the magnetic mirror field and curved field regions therebetween. Moreover, Bohm diffusion losses can be offset by suitably proportioning the total length of the straight sections to that of the curved sections as described. Moreover, energetic charged plasma particles emerging endwise from the containment zones are directed by the toroidal curved fields to enter a successive zone thereby improving the possibility of undergoing a fusion reaction and avoiding any detrimental loss of the energy resident in the kinetic motion of the charged particles.

A controlled thermonuclear reactor, such as the foregoing, and operating with a deuterium or deuterium-tritium fuel mixture yields a major proportion of the output energy in the form of 14 MeV neutrons resulting from D—D and DT reactions. With DT reactions, 80 percent of the energy resides in the 14 MeV neutrons. Other energetic particles such as $He_4^+$ are also produced and are retained in the containment zone to supply at least a portion of the heat energy required to build up and maintain the fusion reaction rate. In a pulsed as well as in a continuous operation, plasma particles may escape radially, e.g., at the end of the cycle, in quantities such as to present a hazard of destroying or eroding the vessel wall. Accordingly, a shield wall structure 71 is supported, at least, in each vacuum chamber 16, in spaced relation to the respective linear vessel wall section 13. The shield wall 71 may be constructed of high heat conductivity metal such as aluminum, copper or of a refractory metal. Being interposed between the plasma and vessel wall 13, the wall 71 intercepts plasma particles converting the energy thereof into heat which is eventually radiated to the vessel wall or which may be dissipated by providing a coolant circuit (not shown) to cool the shield wall.

Heat arriving or generated in the vessel walls 13 and 14 of each of the reactor sections can be removed for power generation or disposal by providing a heat transfer circuit. Such a circuit may include a closed chamber 72 defined between a shell 73 and vessel wall section 13, of each of said reactor sections. A coolant such as water, organic hydrocarbon, liquid metal or the like may be circulated therethrough by means (not shown) external to the reactor to absorb the heat and transfer it externally for use or disposal.

A second chamber 74 may be defined at least between a cylindrical shell structure 76 and shell 73 for disposition of a blanket of fertile fusionable fuel breeder material 77 therein to react with the 14 MeV neutrons emerging from the fusion plasma. For example, a breeder blanket composed of a neutron moderating and multiplying fertile breeder 77 material, such as lithium fluoride, may be disposed or circulated therethrough to produce tritium which can be recovered and recycled as a fuel in the reactor. Such a blanket material, i.e., lithium fluoride is intensely corrosive and may become heated, e.g., to about 1,000° C. as a result of moderating and reacting with the neutrons wherefore the chamber 74 should be defined by walls, e.g., shell members 73 and 76 which are constructed of niobium or other corrosive resistant refractory material suitable for use in an intense neutron flux. Cooling coils (not shown) may be used therein to remove heat from material 77 or the molten material may be circulated to heat exchangers (not shown) exterior to the reactor.

In the event that the magnet coils are superconductors or other material susceptible to damage from neutrons, a neutron shield is disposed between the blanket or other region traversed by the neutron flux in the reactor and the coil. Such a shield may take the form of a shell structure 78 disposed in spaced concentric relation to shell structure 76 and defining therewith a chamber 79, in each of said reactor sections. Furthermore, curved extensions 76', 78', of shell structures 76, 78, respectively, may be provided between curved reactor vessel sections 14 and coils 27, to define an extension 79' of chamber 79, therebetween. Borated water (not shown) or other fluidic neutron absorber may then be disposed or circulated therethrough to absorb neutrons emerging from blanket 77 or traveling directly from the fusion plasma 63. In the event a significant neutron flux emerges axially from the fusion plasma 63, blanket material 77' may be disposed between curved extension 73', 76' of shell 73 and shell structure 76, respectively. Coolant may also be circulated in a curved coolant chamber extension 72' disposed between curved vessel wall 14 and the curved extension 73' of shell 73. Thermal insulation (not shown) may be incorporated into shell structures 76, 76' to minimize heat transfer between the blanket 77 and shield material. Similar insulation (not shown) is also incorporated into the shell structure 78, 78' and in an exterior casing or housing structure 81 which is disposed circumjacent coils 25, 26 and 27, particularly if a cryogenic or superconducting magnet coil is employed. It will be understood that cryogenic refrigeration equipment (not shown) will be utilized to cool such coils to operating temperature in accord with conventional practice. A biological shield (not shown) is generally disposed to enclose the reactor particularly where high neutron flux and secondary radiation is produced.

Operating parameters for a polygonal-toroidal controlled thermonuclear reaction are set forth in the following example:

EXAMPLE

As an illustrative example the parameters of a plasma with a total length $L = 250$ meters, and a curved section total length of about 20 meters (hexagonal-toroidal). This is a ratio of straight to curved section lengths of about 15:1 but which may be varied from about 20:1 to as low as about 5:1, dependent on the rate, e.g., of loss by Bohm diffusion or other losses created by field curvature. $B_o = 250\ kG$ are given in this section.

1. E-layer parameters
   Proton energy $E_o = 1.86\ BeV$ ($\gamma = 3$)
   Average loading factor $\bar{\zeta} = 0.25$
   Number of protons/meter $N_o = 2.7 \cdot 10^{17}$
   Energy stored in the E-layer
   $W_{Je} = 80\ MJ/meter$
   E-layer radius ≈ 50 cm
2. Ignitor plasma parameters
   (cf. equation XXI supra)
3. Plasma parameters'
   Temperature $U = 10\ keV$
   Density $n = 2.5 \cdot 10^{16}$ ions/cm³
   Bohm lifetime $T_B = 1.12$ msec.
   Plasma lifetime $T_f = 15.2$ msec.
   Pulse length* $T_o = 100$ msec.
   Energy stored in the plasma $W_{Jp} = 32\ MJ/meter$
   Plasma $\beta = 0.33$
4. Background gas, e.g., $H_2^+$ density — $10^{10}$ particles cc. or $H^+$ plasma $10^8$–$10^{10}$ particles cc.

*i.e., duration of fusion reaction before the E-layer is substantially depleted.

Energy release by DT reactions during the pulse $W_{JF} = 12{,}000\ MW/meter$
Bremsstrahlung $W_R = 260\ MW/meter$
Energy produced in the blanket ($n$ $Li^6$, $n$ $Na^{23}$) for $K = 1.6^*$ $W_{fb} = 8{,}000\ MW/meter$
Net electric power produced (assuming topping cycle 60% efficiency) $W_e = 12{,}000\ MW/meter$
Net electric energy produced per pulse (for $T_o = 100$ msec) $W_{je} = 1{,}200\ MJ/meter$
Time between pulses $T_p = 50$ seconds
Total electric power produced $W_e = 6{,}500\ MW$
Proton beam power for the E-Layer (4 BeV $H_2^+$, 100 mA $W_e = 400\ MW$ Neon beam power for the ignitor
  plasma (1.6 BeV Ne³⁺, 160 mA)   $W_n$=250 MW
Ratio of electric power produced
  to proton and neon beam power   $Q_e$=10
Net electric power   $W_{ce}$=5,850 MW

*K is the neutron multiplication factor by n, 2n reactions of typical blanket materials, e.g., lithium fluoride.

The energy deposition in the vacuum wall from the plasma radiation during the pulse is several hundred joules/cm², and the neutron flux exceeds 10,000 joules/cm² of the blanket. The radiation flux of a single pulse can raise the temperature of a thin vacuum wall by several hundred degrees centigrade. In order to avoid such large temperature oscillations the vacuum wall should be protected with a thin shield 71 which absorbs the radiation during the pulse and re-radiates to the vacuum wall during the time between pulses. The energy density per unity area of the wall is proportional to ($B^4 R T_o$). The pulse time $T_o$ depends on E-layer lifetime which is proportional to ($\gamma/n$) or ($R/B$). Thus the energy density is proportional to $B^3 R^2$ which is proportional to the ratio $T_B/T_f$ or to the ratio of the plasma radius to the total length of the straight sections. Equation IX can be rewritten $$R^2 \left(\frac{B}{10^5}\right)^3 = \frac{110\lambda}{\alpha\beta} \left(\frac{R}{L}\right) \qquad \text{XXIII.}$$

Since $R/L$ is proportional to the energy density at the wall it is possible to reduce it by a factor of 4, by reducing the plasma radius to 25 cm and $2^{length\ to}$ 500 meters.

If the plasma confinement time in the toroidal section is raised to 30 Bohm times, a steady state operation is possible. The required field is reduced to 100 kG and the plasma density to $2 \cdot 10^{15}$ ions/cm³, but the quantity $Q_e \approx 6.5$. Further improvement of confinement time to 60 Bohm times will allow operation at 20 keV resulting in achieving a $Q_e = 13$.

I claim:

1. A device for producing a high temperature gas or plasma comprising:
   a. vacuum vessel means including a plurality in the range of five to about ten of generally straight cylindrical sections joined by curved generally cylindrical sections and defining a generally polygonal-toroidal chamber having linear portions joined by curved portions;
   b. solenoidal coil means having a uniform ampere turns distribution along the linear chamber portions and increased ampere turns per unit length along the curved chamber portions and adjacent end regions of the linear chamber portions to produce a generally polygonal-toroidal axially symmetric field having an elongated linear region of substantially uniform intensity along the linear vessel section as well as an increased field intensity in the range of about 1.1 to about twice said uniform intensity along adjacent end regions of the linear chamber portions and in said curved chamber portions, said linear magnetic field regions having a total length with a ratio in the range of about 5:1 to about 20:1 of the total length of said curved magnetic field regions;
   c. means for directing a beam of dissociable high energy particles into said straight vessel sections to be dissociated to form ions which are trapped in the magnetic field to produce a cylindrical E-layer of relativistic charged particles rotating along the axis of said uniform intensity linear magnetic field regions with the magnetic field of said E-layer interacting with the axially symmetric magnetic field to define a magnetic field potential well charged particle containment zone in the vicinity of said E-layer; and
   d. means for introducing an electrically neutral fuel material into said containment zone to be ionized and heated to form a high temperature plasma confined in said containment zone.

2. Apparatus as defined in claim 1 wherein said dissociable particles are dissociable to produce a charged particle of relativistic energies selected from the group consisting of H⁺, D⁺, T⁺, He₃⁺, and He₄⁺ and wherein said fuel material comprises a fusionable light isotope nuclide wherefor said high temperature plasma formed in said containment zone is a controlled fusion reaction plasma.

3. Apparatus as defined in claim 2 wherein said E-layer has a current density providing an average diamagnetic strength of at least 25 percent of the uniform intensity magnetic field region to provide a magnetic potential well depth, $\Delta B/B$ external, of at least 0.25, thereby providing for stabilization of said magnetic containment zone.

4. Apparatus as defined in claim 3 wherein said linear magnetic field regions have an intensity of above about 50 kilogauss.

5. Apparatus as defined in claim 4 wherein said disassociable particles have an energy of above about 50 MeV.

6. Apparatus as defined in claim 5 wherein means are provided to direct high energy relatively heavy nuclide material of the group consisting of Ne and Xe particles into said magnetic field to be dissociated by interaction with at least said E-layer particles to form ions which are trapped to form a high energy plasma adapted for heating said fuel material to a high temperature.

7. Apparatus as defined in claim 6 wherein said relativistic charged particles have an energy of at least about 1 BeV.

8. Apparatus as defined in claim 5 wherein means are provided for directing a light nuclide gas or vapor into the path of the beam of high energy particles to interact therewith to form said ions which are trapped to form said relativistic charged particle E-layer.

9. Apparatus as defined in claim 5 wherein said linear magnetic field regions have an intensity of above about 100 kilogauss and said dissociable particles comprise a molecular ion beam wherefor said particles are dissociated by a Lorentz force mechanism in said magnetic field to form ions which are trapped to form said E-layer.

10. Apparatus as defined in claim 8 wherein said light nuclide gas or vapor comprises lithium vapor.

* * * * *